United States Patent [19]
O'Connor

[11] 3,772,494
[45] Nov. 13, 1973

[54] ELECTRICAL MACHINING STRUCTURE

[76] Inventor: Thomas J. O'Connor, 100 Morgan Rd., Ann Arbor, Mich. 48106

[22] Filed: June 14, 1971

[21] Appl. No.: 152,945

Related U.S. Application Data

[62] Division of Ser. No. 768,699, Oct. 18, 1968, Pat. No. 3,590,210.

[52] U.S. Cl. .............................................. 219/69 G
[51] Int. Cl. ............................ B23p 1/14, B23p 1/08
[58] Field of Search .................................. 219/69 G

[56] References Cited
UNITED STATES PATENTS

| | | | |
|---|---|---|---|
| 1,061,612 | 5/1913 | Heroult | 219/69 G |
| 3,366,770 | 1/1968 | Blatt et al. | 219/69 G |
| 3,456,088 | 7/1969 | Trible et al. | 219/69 G |
| 3,541,291 | 11/1970 | Johanson | 219/69 G |
| 3,562,474 | 2/1971 | Sellmann | 219/69 G |

FOREIGN PATENTS OR APPLICATIONS

| | | | |
|---|---|---|---|
| 388,488 | 6/1965 | Switzerland | 219/69 G |
| 759,190 | 10/1956 | Great Britain | 219/69 G |

*Primary Examiner*—R. F. Staubly
*Attorney*—Whittemore, Hulbert & Belknap

[57] ABSTRACT

A machine tool for electrical machining is disclosed which includes parallel linkage structure for moving an electrode toward and away from a workpiece. The parallel linkage structure, as disclosed, is driven by servo means to maintain a predetermined spark gap between an electrode secured to the machine tool structure and a workpiece supported thereby.

A fixed work table is provided as part of the machine tool structure in conjunction with a work tank having no bottom which tank is vertically movable. The fixed work table forms the bottom of the work tank with the tank in an upper position. On lowering of the tank fluid in the tank is rapidly drained into a lower storage tank from which it may be pumped through a filter after which it is stored in an upper storage for reuse. The work tank is provided with a removable upper portion to facilitate positioning of a workpiece in the fixed worktable.

A universal manifold is also provided whereby different fluid flow patterns may be provided from a single manifold to facilitate machining of workpieces requiring different flow patterns. The flow patterns of the universal manifold are readily selected by rotation of cylinders in the manifold.

3 Claims, 5 Drawing Figures

INVENTOR.
THOMAS J. O'CONNOR
ATTORNEYS

INVENTOR.
THOMAS J. O'CONNOR
BY
ATTORNEYS

ELECTRICAL MACHINING STRUCTURE

CROSS REFERENCE TO RELATED APPLICATIONS

The present application is a Division of the United States patent application, Ser. No. 768,699, filed Oct. 18, 1968, now U.S. Pat. No. 3,590,210, issued June 29, 1971.

BACKGROUND OF THE INVENTION

1. Field of the Invention

The invention relates to electrical machining of conductive workpieces and refers more specifically to machining of large workpieces with electrical machining structure, including parallel linkage means for moving a large electrode in accordance with a spark gap between the electrode and a workpiece, and universal manifold structure for providing flexibility in flushing of workpieces.

2. Description of the Prior Art

In the past electrical machining apparatus has generally included a C-frame to which a ram has been secured for vertical movement toward and away from a workpiece. Obtaining accurate ram movement with large electrodes secured to the ram has in the past been a problem. Also, such structure has generally required the servo mechanism for moving the ram in accordance with the spark gap between the workpiece and electrode to be located at the ram which is not always desirable.

Further, prior electrical machining structures have normally included a fixed work table and fixed tank, whereby positioning of a workpiece on the table in the tank has required removal of the front of the tank and positioning the workpiece on the work table from the front thereof. Such tanks in the past have also usually required considerable time for draining of fluid maintained therein during electrical cutting or have had to be equipped with special, complicated drain facilities.

In addition, in the past, wherein workpieces were required to be flushed during machining, separate manifolds have normally been constructed for each type of workpiece providing flushing at predetermined areas. The provision of separate manifolds for each different workpiece to be machined is expensive and requires the storage of or disposal of each individual manifold after use. Such prior practices have often resulted in improper flushing of workpieces especially on small jobs where the expense of constructing a special manifold has been prohibitive.

SUMMARY OF THE INVENTION

In accordance with the present invention there is provided a machine tool for electrical machining structure, including a vertically movable platen to which an electrode may be secured and parallel linkage structure for moving the platen vertically in accordance with the spark gap between a workpiece positioned on the machine tool and an electrode carried by the platen. The machine tool further includes a vertically movable work tank having no bottom and a fixed work table which forms the bottom of the work tank with the work tank in a raised position. Such structure permits rapid draining of fluid from the work tank on lowering of the tank and in conjunction with a removable upper portion of the work tank permits installation of a workpiece on the work table from three sides thereof.

Also included in the invention is a universal manifold structure which may be secured to the work table or the upper platen, including means for varying the flush openings therethrough in accordance with a plurality of predetermined options. The necessity for separate manifold structures for each type of workpiece to be machined is therefore removed.

DESCRIPTION OF THE PREFERRED EMBODIMENT

Figure 3:
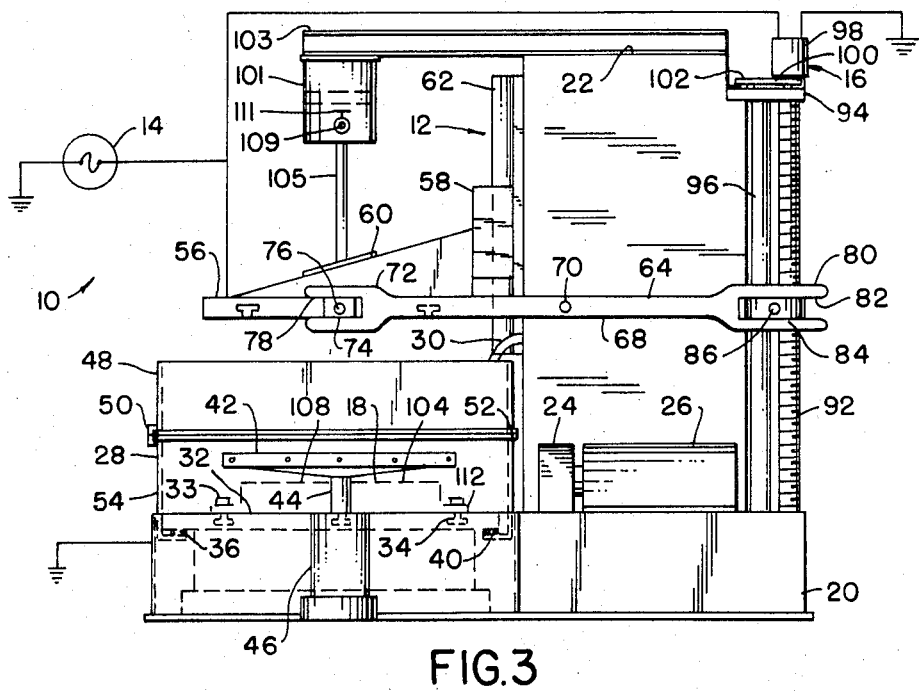
FIG. 3 is a side view of the electrical machining structure of FIG. 1.

The electrical machining structure 10, illustrated best in FIG. 3, includes the machine tool structure of the invention 12 in conjunction with an electrical machining power supply 14 and servo drive structure 16. Universal manifold structure 18, constructed in accordance with the invention, is hsown in conjunction with the machine tool 12.

The electrical machining power supply 14 and the servo structure 16, illustrated in FIG. 3, are conventional and may be an electrical discharge power supply and servo structure for maintaining a predetermined spark gap between an electrode secured to and a workpiece positioned on to the machine tool 12 in accordance with the electrical signal between the electrode and workpiece as will be understood by those familiar with the electrical discharge machining art. These structures will not therefore be considered in detail herein.

Figure 1:
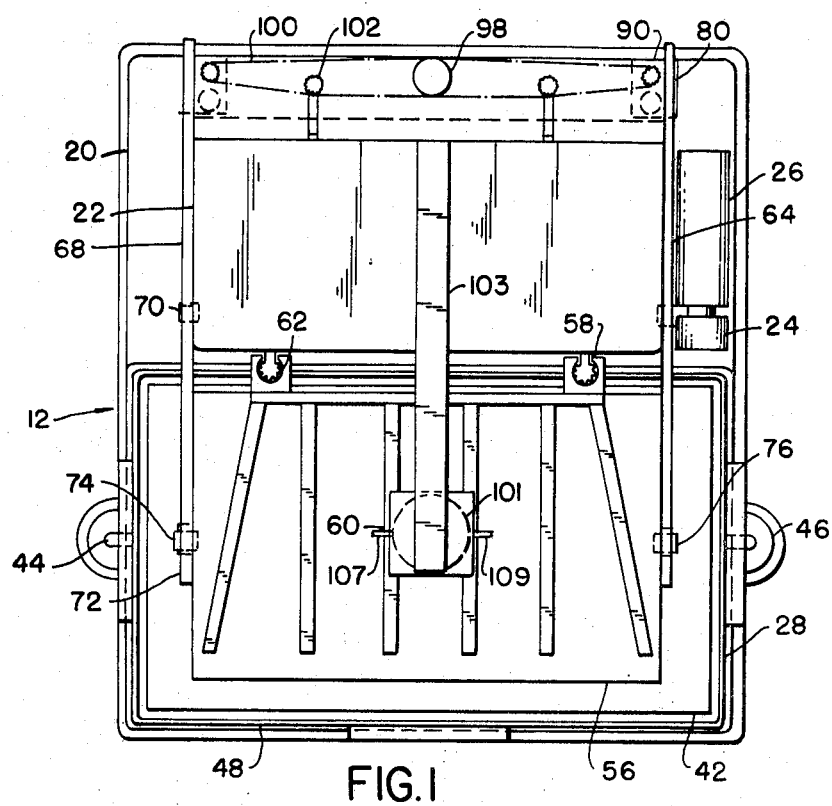
FIG. 1 is a top view of electrical machining structure constructed in accordance with the invention.
Figure 2:
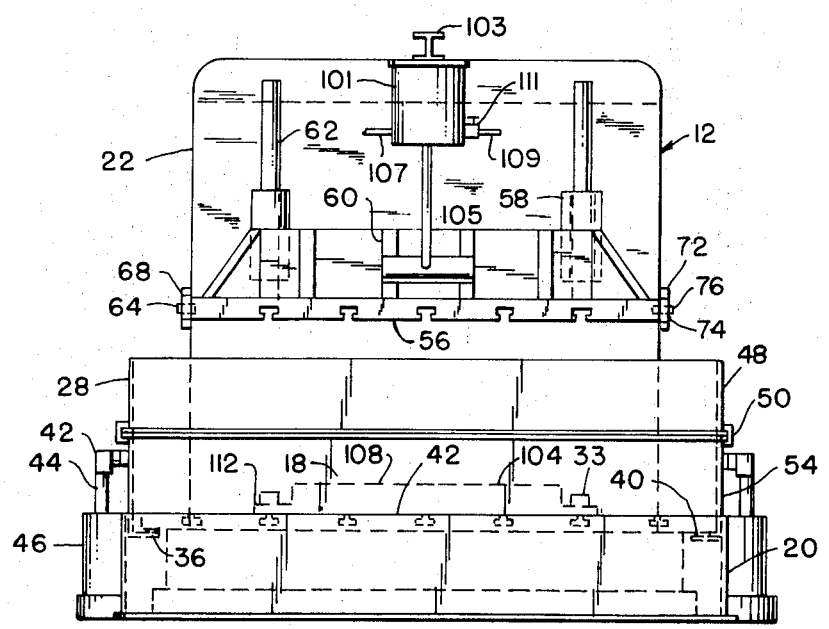
FIG. 2 is a front view of the electrical machining structure of FIG. 1.

The machine tool 12, as illustrated in FIGS. 1 through 3, includes a lower storage tank 20 and an upper storage tank 22, properly reinforced to serve as the basic structural frame for the machine tool. Dielectric fluid may be pumped from the lower storage tank 20 by means of pump 24 through filter 26 into the upper storage tank 22. The dielectric fluid may then be fed either by gravity or under pump pressure into the work tank 28 of the machine tool 12 through flexible conduit 30, as desired.

A fixed machine tool table 32 is positioned in the lower storage tank20, as shown best in FIGS. 2 and 3. The table 32 has T-shaped slots 34 on the upper surface thereof to which the universal manifold structure 18 may be secured by appropriate mounting bolts 33. The table 32 forms the bottom of the work tank 28 with the work tank 28 in the upper position, as shown in FIG. 3. Thus, when the tank 28 is lowered, dielectric fluid therein is rapidly drained into the lower storage tank 20.

Tank 28, as shown best in FIGS. 2 and 3, includes the flanges 36. In the upper position of tank 28, the sealing means 40 extending around the periphery of the flanges 36 seals between the tank 28 and fixed table 32.

Tank 28 is supported at the opposite sides thereof by brackets 42 connected to piston rods 44. The piston rods 44 are reciprocated by piston and cylinder structures 46 at the opposite sides of the lower storage tank 20.

A removable portion 48 is provided on the tank 28 and is secured thereto by clamping means 50. A seal 52 is provided as necessary between the removable portion 48 and the lower portion 54 of the tank 28. Thus, in the lower position of the tank 28, the top of the lower portion 54 of the tank is flush with the top of the worktable 32, whereby with the removable portion 48 of the tank 28 removed therefrom, a workpiece may be mounted on the worktable 32 from any side thereof.

The upper platen 56 of the machine tool 12 is supported on ball slides 58 by the triangular brackets 60. Slides 58 are reciprocally movable vertically on the guide shafts 62 which are in turn secured to the upper storage chamber 22 reinforced to provide a rigid mount for the guides 62. Thus, an electrode secured to the platen 56 may be moved toward or away from a workpiece on the work table 32 on movement of the slides 58 on the guides 62.

Movement of the platen 56 is effected by the parallel linkage structures 64 provided at the opposite sides of the machine tool 12. Parallel linkage strucures 64 include the linkage lever 68 pivotally mounted centrally to the upper storage tank 22 by pivot means 70. The left end of the linkage lever 68, as shown in FIG. 3, is bifurcated and is fitted over the slide block 74 pivotally connected to the platen 56. Thus, as the lever 68 is pivoted about its pivot mounting 70, the slide block 74 is pivoted about its pivot mounting 76 and slides in and out of the slot 78 provided by the bifurcated end 72 of the lever 68 to permit movement up and down of the platen 56.

The other end 80 of the lever 68 is similarly bifurcated to provide a guide slot 82 in which a slide block 84 moves. The slide block 84 is pivotally mounted by pivot means 86 to a ball nut 90.

The ball nut 90 is threadedly engaged with the ball screw 92. The ball screw 92 is rotatably mounted on the lower storage tank 20 at the lower end thereof and is rotatably mounted in bracket 94 at the upper end. Nut 90 is guided in its vertical movement at each side of the upper storage tank 22 by the guide shafts 96 rigidly mounted at the opposite ends to the lower storage tank 20 and the bracket 94.

Driving of the ball screws 92 is accomplished through the servo motor 98 and the servo drive structure 16 through chain drive structure 100 in conjunction with idler pulleys 102, as shown best in FIG. 1.

As shown, the weight of the platen 56 and any electrode secured thereto may be counterbalanced by the piston and cylinder structure 101 secured to beam 103 mounted on the upper storage tank 22 and connected to platen 56 through piston rod 105. Predetermined pressure may be maintained in the piston and cylinder structure 101 by regulation of fluid, hydraulic or pneumatic, through conduits 107 and 109 from a source (not shown) by valve 111.

Figure 4:
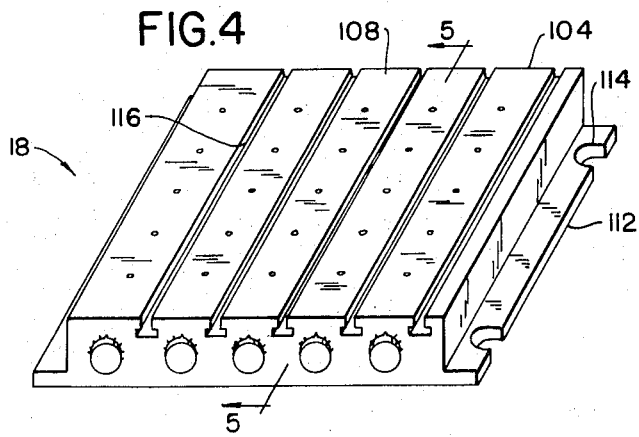
FIG. 4 is an enlarged isometric view of universal manifold structure constructed in accordance with the invention.
Figure 5:
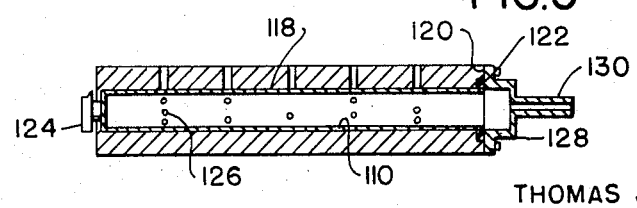
FIG. 5 is a section view of the universal manifold structure illustrated in FIG. 4 taken substantially on the line 5—5 in FIG. 4.

The universal manifold structure 18, shown best in FIGS. 4 and 5, includes a manifold base member 104 having a plurality of linearly positioned openings 106 in the upper surface 108 thereof communicating with a plurality of cylindrical openings 110 extending through the base 104 beneath the openings 106.

Mounting flanges 112 including bolt openings 114 are provided at the opposite ends of the manifold structure 18. T-shaped mounting slots 116 by which an electrode or a workpiece is secured to the manifold structure 18 extend parallel to the cylindrical openings through the base between the openings 106, as shown best in FIG. 4.

Separate hollow cylindrical members 118 are positioned in the cylindrical openings 110. The cylindrical members 118 are provided with an abutting flange 120 on the rear thereof fitting within an enlarged portion 122 of the cylindrical openings through the base 104 of the manifold structure 18. Thus, the cylindrical members 118 are retained in the openings 110 while rotation of the cylindrical members 118 by means of the indicator knobs 124 secured thereto is permitted.

The cylindrical members 118 are further provided with a plurality of angularly spaced radially extending openings 126 at locations longitudinally thereof which align with openings 106 in the manifold base member 104. Thus, on rotation of the cylindrical members 118, a fluid passage is provided through the interior of the hollow cylindrical members 118 and the openings 126 aligned with openings 106 in the manifold base 104. By providing properly spaced openings 126 in the cylindrical members 118 and rotating the cylindrical members 118 into positions which may be indicated by the indicator knob 124, different flow patterns of dielectric fluid from the manifold structure 18 may be selected.

Hydraulic fluid is provided to the interior of the cylindrical members 118 through a closed channel structure 128 secured to the back of the manifold structure 18. The channel structure 128 may be connected for example to the dielectric hose 30 through the connecting stub 130. The channel structure 128 also serves to secure the flanges 120 of the cylindrical members 118 in the recesses 122 in the base member 104.

Thus, in overall operation of the electrical machining apparatus 10, the tank 28 is initially in a lower position with the portion 28 removed therefrom. The manifold structure 18 is secured to the work table 32 and a workpiece is secured to the manifold structure 18. The cylindrical members of the manifold structure 18 are rotated to provide a desired dielectric fluid flow through the manifold 18. The flexible tube 30 from the upper dielectric storage tank 22 is connected to the closed channel 128 of the manifold structure 18.

The upper portion 48 of the tank 28 is then secured thereto and the tank 28 is raised to an upper position wherein the work table 32 seals the bottom of the tank 48. An electrode previously secured to the platen 56 is then caused to move down to provide a predetermined spark gap between the electrode and workpiece on pivotal movement of the levers 68 about the pivot mounting 70 thereof.

Pivoting of the levers 68 is caused by the gap between the electrode and workpiece as sensed in the servo structure 16. The motor 98 produces rotation of the screw 92 in a direction to move the nut 90 up or down and thus pivot the lever 68 to maintain a predetermined spark gap.

Electrical power is provided from the electrical discharge power supply 14 and the workpiece is machined in the presence of dielectric flushed between the electrode and workpiece from the manifold structure 18.

When the machining of the workpiece is completed, the tank 48 is lowered to dump dielectric into the lower storage tank 20. Dielectric from the lower storage tank 20 is subsequently pumped through filter 26 into the upper storage tank 22 from which it may be reused, as previously indicated. The upper portion 48 of the tank 28 may then be removed so that the machined workpiece may be removed from the manifold structure 18 to complete a cycle of operation of the electrical machining structure 10.

While one embodiment of the present invention has been considered in detail, it will be understood that other embodiments and modifications are contemplated. Thus, for example, the structure of the invention is suitable for use in electrochemical machining as well as electrical discharge machining. It is the intention to include all embodiments and modifications as are defined by the appended claims within the scope of the invention.

What I claim as my invention is:

1. In electrical discharge machining structure, means for moving an electrode toward a workpiece comprising an electrical rotary stepping motor having an axis of rotation, a ball screw having an axis of rotation, means for connecting the ball screw to the motor with their axes of rotation parallel for rotation of the ball screw in accordance with the rotation of the motor, a ball nut engaged with the ball screw for movement therealong in accordance with the rotation of the ball screw, means engaged with the ball nut for guiding the ball nut in its movement along the ball screw, a lever, means pivotally mounting the lever centrally thereof, said lever having bifurcated ends one of which is slidably engaged with a first slide block pivotally connected to the means for guiding the ball nut so that the lever is pivoted about the central pivot mounting therefor on movement of the nut along the screw, a guide, a slide positioned on the guide for supporting an electrode for movement toward and away from a workpiece on movement of the slide relative to the guide, a second slide block pivotally mounted on the slide and slidably engaged with the other bifurcated end of the lever whereby the slide is moved along the glide on pivotal movement of the lever in response to movement of the nut on rotation of the screw to move an electrode connected to the slide toward and away from a workpiece.

2. Structure as set forth in claim 1 wherein two spaced apart parallel levers, guide blocks, guides, nuts and screws are provided, one on each side of the slide, the motor is positioned between the screws and sprocket and endless linear member means are provided between the motor and screws for synchronously rotating the screws on rotation of the motor.

3. Structure as set forth in claim 1 wherein piston and cylinder means are secured to the slide for counterbalancing the weight of the slide.

* * * * *